(12) United States Patent
Ueno et al.

(10) Patent No.: US 11,314,194 B2
(45) Date of Patent: Apr. 26, 2022

(54) LIGHTING DEVICE, STATIC ELIMINATING DEVICE, AND IMAGE FORMING APPARATUS THEREWITH

(71) Applicant: KYOCERA Document Solutions Inc., Osaka (JP)

(72) Inventors: Masahiro Ueno, Osaka (JP); Hiroaki Ohashi, Osaka (JP); Hirofumi Tsuji, Osaka (JP); Hiroaki Takai, Osaka (JP); Yasutaka Hashimoto, Osaka (JP); Tomoyasu Yamada, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/984,838

(22) Filed: Aug. 4, 2020

(65) Prior Publication Data
US 2021/0041825 A1 Feb. 11, 2021

(30) Foreign Application Priority Data
Aug. 9, 2019 (JP) .............................. JP2019-148008

(51) Int. Cl.
*G03G 21/08* (2006.01)
*F21V 8/00* (2006.01)

(52) U.S. Cl.
CPC ........... *G03G 21/08* (2013.01); *G02B 6/0073* (2013.01); *G02B 6/0088* (2013.01); *G02B 6/0033* (2013.01)

(58) Field of Classification Search
CPC .... G03G 21/08; G02B 6/0073; G02B 6/0088; G02B 6/0033
See application file for complete search history.

(56) References Cited

U.S. PATENT DOCUMENTS

| 9,354,561 B1 * | 5/2016 | Oi ........................... G03G 21/08 |
| 2015/0277359 A1 * | 10/2015 | Abe ........................ G03G 21/06 399/128 |

FOREIGN PATENT DOCUMENTS

| CN | 104950617 A | * | 9/2015 | ......... G03G 21/1814 |
| JP | 2003-295717 A | | 10/2003 | |
| JP | 2003295717 A | * | 10/2003 | |

* cited by examiner

*Primary Examiner* — Mary Ellen Bowman
(74) *Attorney, Agent, or Firm* — Stein IP, LLC

(57) ABSTRACT

A lighting device includes a light source, a light guide, a light guide cover, and a unit frame. The light guide is in a bar form and, while guiding light that has entered from the light source along the axial direction, sends forth the light. The light guide cover holds the light guide. The light guide cover is attached to a unit frame. The light guide cover includes a main body portion and a plurality of light guide holding portions provided along the longitudinal direction of the main body portion and holding the light guide at a plurality of places, and a plurality of guide engaging portions provided along the longitudinal direction of the main body portion. The unit frame has a cover fitting face to which the light guide cover is fitted and a plurality of cover guides with which a plurality of guide engaging portions engage respectively.

10 Claims, 6 Drawing Sheets

LIGHTING DEVICE, STATIC ELIMINATING DEVICE, AND IMAGE FORMING APPARATUS THEREWITH

INCORPORATION BY REFERENCE

This application is based on and claims the benefit of Japanese Patent Application No. 2019-148008 filed on Aug. 9, 2019, the contents of which are hereby incorporated by reference.

BACKGROUND

The present disclosure relates to a lighting device and a static eliminating device including a light source and a light guide which, while guiding the light from the light source, sends forth the light, and also relates to an image forming apparatus provided therewith.

An image forming apparatus is provided with, around an image carrier, a charging portion, an exposure portion, a developing portion, a transfer portion, a cleaning portion, a static eliminating device, and the like. When an image is formed, after the surface of the image carrier is electrostatically charged uniformly by the charging portion, it is exposed to light by the exposure portion so that an electrostatic latent image is formed on the surface of the image carrier, and the electrostatic latent image is developed by the developing portion. Then, the developed toner image is transferred to a recording medium by the transfer portion, and the recording medium is, after having been transferred to the fixing portion so that the toner image is fixed on it, discharged outside the apparatus. The toner left on the image carrier during transfer is removed by the cleaning portion. After transfer, the residual electric charge on the image carrier is removed by the static eliminating device, and the image carrier is charged again by the charging portion. By removing the residual electric charge before electrostatic charging, the surface of the image carrier can be electrostatically charged uniformly again. To eliminate the residual electric charge, for example, static elimination with light is used.

A known static eliminating device includes, for example, an LED lamp (light source), a light entrance portion for receiving the light from the LED lamp, and a bar-form light guide (light guide member) extending along the axial direction of the photosensitive drum. In a part of the light guide opposite to the photosensitive drum, a reflective portion for reflecting the light from the LED lamp is formed. The light that has entered the light guide travels inside the light guide while being diffused, is reflected by the reflective portion toward the photosensitive drum side, and exits toward the photosensitive drum.

SUMMARY

According to one aspect of the present disclosure, a lighting device includes a light source, a light guide, a light guide cover, and a unit frame. The light guide is in a bar form and, while guiding light that has entered from the light source along the axial direction, sends forth the light. The light guide cover holds the light guide along the longitudinal direction. The light guide cover is attached to a unit frame. The light guide cover includes an elongate flat plate-form main body portion, a plurality of light guide holding portions which are provided along the longitudinal direction of the main body portion and which hold the light guide at a plurality of places in the longitudinal direction, and a plurality of guide engaging portions provided along the longitudinal direction of the main body portion. The unit frame has a cover fitting face to which the light guide cover is fitted and a plurality of cover guides with which the plurality of guide engaging portions engage respectively.

This and other objects of the present disclosure, and the specific benefits obtained according to the present disclosure, will become apparent from the description of embodiments which follows.

DETAILED DESCRIPTION

Figure 1:
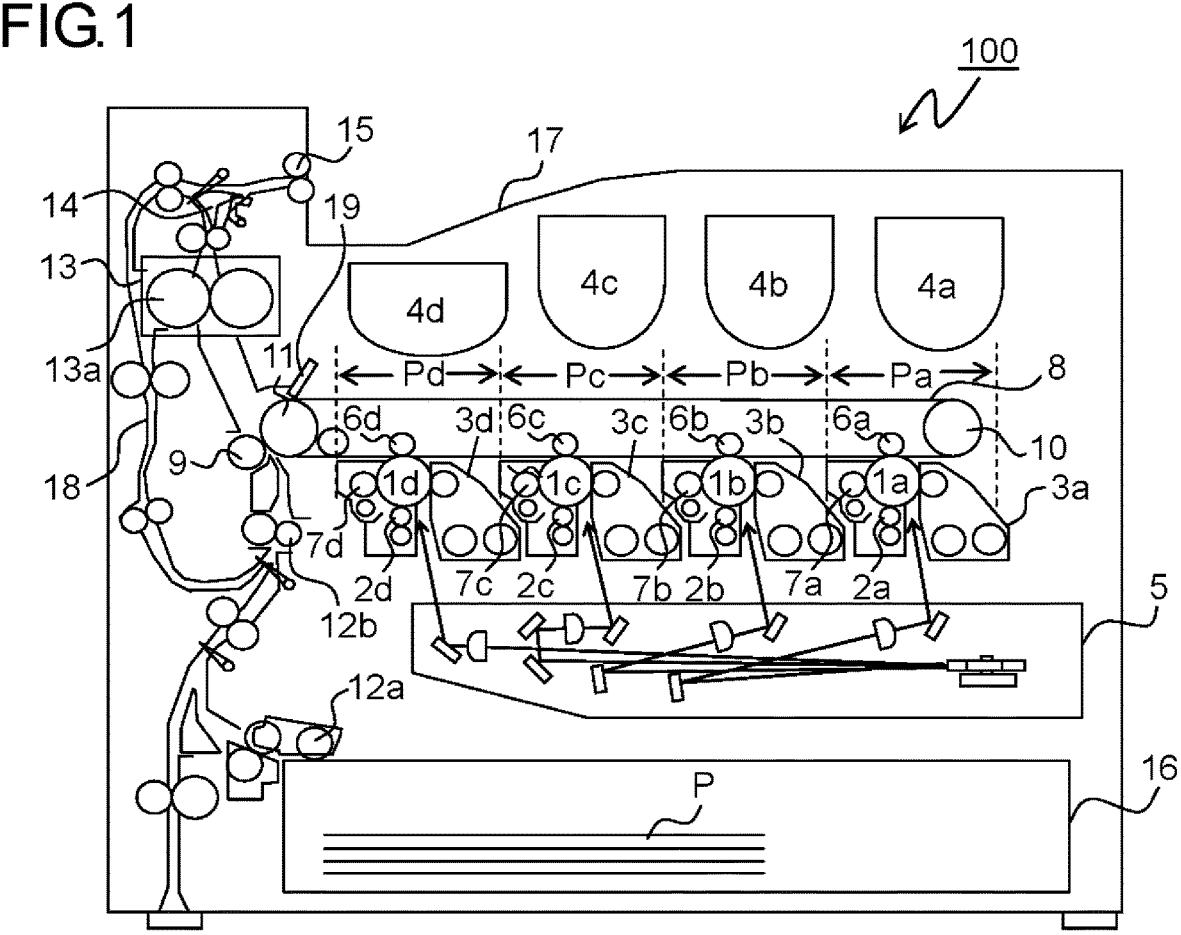
FIG. 1 is a side sectional view showing a structure of an image forming apparatus provided with a static eliminating device according to the present disclosure.

Hereinafter, with reference to the accompanying drawings, embodiments of the present disclosure will be described. FIG. 1 is a sectional view showing the internal structure of an image forming apparatus 100 provided with a static eliminating device 20 according to the present disclosure. In the main body of the image forming apparatus 100 (here, a color printer), four image forming portions, Pa, Pb, Pc and Pd are arranged in this order from the upstream side in the conveying direction (from the right side in FIG. 1). These image forming portions Pa to Pd are provided so as to correspond to images of four different colors (yellow, cyan, magenta, and black) and sequentially form yellow, cyan, magenta, and black images through the processes of electrostatic charging, exposure, developing, and transfer.

In these image forming portions Pa to Pd, photosensitive drums (image carriers) 1a, 1b, 1c, and 1d are respectively arranged which carry visible images (toner images) of the different colors. The photosensitive drums 1a to 1d are organic photosensitive members formed by, for example, laying an organic photosensitive layer (OPC) around the outer circumferential face of a drum tube of aluminum and then further laying a coat layer on the surface of the organic photosensitive layer. The photosensitive drums 1a to 1d are driven to rotate by a main motor (unillustrated). Instead of the organic photosensitive drum, an amorphous silicon photosensitive drum with an amorphous silicon photosensitive layer formed around the outer circumferential face of a drum tube may also be used.

Further, an intermediate transfer belt (intermediate transfer member) 8 which is rotated clockwise in FIG. 1 by a belt driving motor (unillustrated) is provided adjacent to the image forming portions Pa to Pd. Used as the intermediate transfer belt 8 is a sheet of dielectric resin, and typically is a belt without seams (seamless belt). On the downstream-side of a secondary transfer roller 9, a blade-form belt cleaner 19 is arranged for removing toner and the like left on the surface of the intermediate transfer belt 8.

Transfer paper P to which toner images are to be transferred is stored in a sheet cassette 16 arranged in a lower part in the image forming apparatus 100. The transfer paper P is conveyed via a sheet feeding roller 12a and a registration roller pair 12b to a nip portion between the secondary transfer roller 9 and the intermediate transfer belt 8.

Figure 2:
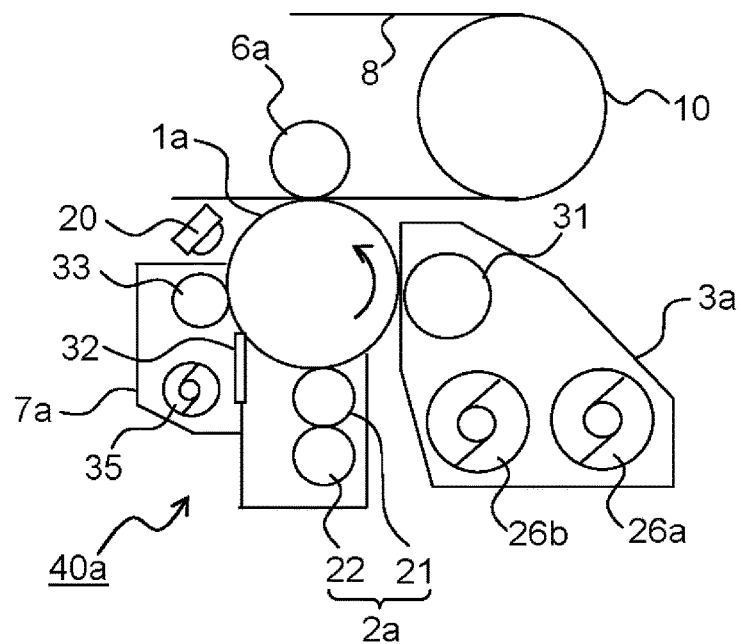
FIG. 2 is an enlarged part view of and around the image forming portion in FIG. 1.

Next, the image forming portions Pa to Pd will be described. FIG. 2 is an enlarged view of and around the image forming portion Pa in FIG. 1. Since the image forming portions Pb to Pd have basically similar structures, no overlapping description will be repeated. As shown in FIG. 2, around and below the photosensitive drum 1a that is rotatably arranged, there are provided a charging device 2a which electrostatically charges the photosensitive drum 1a, an exposure device 5 (see FIG. 1) which exposes the photosensitive drum 1a to light carrying image information, a developing device 3a which forms a toner image on the photosensitive drum 1a, a cleaning device 7a which removes developer (toner) and the like left on the photosensitive drum 1a, a static eliminating device 20, and, across the intermediate transfer belt 8, a primary transfer roller 6a.

A charging device 2a includes a charging roller 21 which makes contact with the photosensitive drum 1a to electrostatically charge the surface of the photosensitive drum 1a and a charging cleaning roller 22 which cleans the charging roller 21. To the charging roller 21, a charging voltage is applied which consists of direct-current voltage, or which is produced by superimposing an alternating-current voltage on a direct-current voltage.

The developing device 3a includes a developing roller 31 which faces the photosensitive drum 1a. In the developing device 3a, two-component developer comprising magnetic carrier and toner is stored. The two-component developer is fed to the developing roller 31 by a stirring-conveying screw 26a and a feeding-conveying screw 26b, so that a magnetic brush is formed on the developing roller 31. To the developing roller 31, a developing voltage is applied which is produced by superimposing an alternating-current voltage on a direct-current voltage.

The cleaning device 7a includes a cleaning blade 32 which removes unused toner on the surface of the photosensitive drum 1a, a rubbing roller 33 which removes unused toner on the surface of the photosensitive drum 1a while rubbing and thereby polishing the surface of the photosensitive drum 1a, and a conveying spiral 35 which discharges, with the cleaning blade 32 and the rubbing roller 33, unused toner removed from the photosensitive drum 1a out of the cleaning device 7a.

The static eliminating device 20 is arranged on the downstream side of the primary transfer roller 6a with respect to the rotation direction of the photosensitive drum 1a, on the upstream side of the cleaning device 7a. The static eliminating device 20 irradiates the photosensitive drums 1a to 1d with static-eliminating light to remove residual electric charge on the surface of the photosensitive drum 1a so that it is equal to or lower than a predetermined potential. The structure of the static eliminating device 20 will be described in detail later.

The photosensitive drum 1a, the charging device 2a, the cleaning device 7a, and the static eliminating device 20 are integrated into a unit. Hereinafter, in the image forming portions Pa to Pd, units composed of the photosensitive drums 1a to 1d, the charging devices 2a to 2d, the cleaning devices 5a to 5d, and static eliminating devices 20 respectively will be referred to as drum units 40a to 40d.

When image data is input from a host device such as a personal computer, first, the surfaces of the photosensitive drums 1a to 1d are electrostatically charged uniformly by the charging devices 2a to 2d. Next, the exposure device 5 irradiates the photosensitive drums 1a to 1d with light based on the image data to form on them electrostatic latent images reflecting the image data. The developing devices 3a to 3d are loaded with predetermined amounts of two-component developer containing yellow, cyan, magenta, and black toner respectively. When, through formation of toner images, which will be described later, the ratio of toner in the two-component developer stored in the developing devices 3a to 3d falls below a determined value, toner is supplied from toner containers 4a to 4d to the developing devices 3a to 3d. The toner in the developer is fed by the developing devices 3a to 3d to the photosensitive drums 1a to 1d, and electrostatically attaches to them to form toner images based on the electrostatic latent images formed through exposure to light from the exposure device 5.

Then, by the primary transfer rollers 6a to 6d, electric fields with a predetermined transfer voltage are applied between the primary transfer rollers 6a to 6d and the photosensitive drums 1a to 1d, and the yellow, cyan, magenta, and black toner images on the photosensitive drums 1a to 1d are primarily transferred to the intermediate transfer belt 8. These images in four colors are formed with a predetermined positional relationship with each other that is prescribed for formation of a predetermined full-color image. Then, in preparation for the subsequent formation of new electrostatic latent images, toner and the like left on the surface of the photosensitive drums 1a to 1d after the primary transfer are removed by the cleaning devices 7a to 7d. The residual electric charge on the surface of the photosensitive drums 1a to 1d is removed by the static eliminating device 20.

When the intermediate transfer belt 8 starts to rotate in the clockwise direction, the transfer paper P is conveyed from the registration roller pair 12b to a nip portion (secondary transfer nip portion) between a driving roller 11 and the secondary transfer roller 9 with predetermined timing, and the full-color image on the intermediate transfer belt 8 is secondarily transferred to the transfer paper P. The transfer paper P on which the toner images have been secondarily transferred is conveyed to a fixing portion 13.

The transfer paper P conveyed to the fixing portion 13 is heated and pressed by a fixing roller pair 13a, and thereby the toner images are fixed on the surface of the transfer paper P to form a predetermined full-color image. The transfer paper P on which the full-color image has been formed has its conveying direction switched by a branch portion 14 which is branched into a plurality of directions, and is then directly (or after being directed to a duplex printing conveying passage 18 to have images formed on both its faces) discharged to a discharge tray 17 by a discharge roller pair 15.

Figure 3:
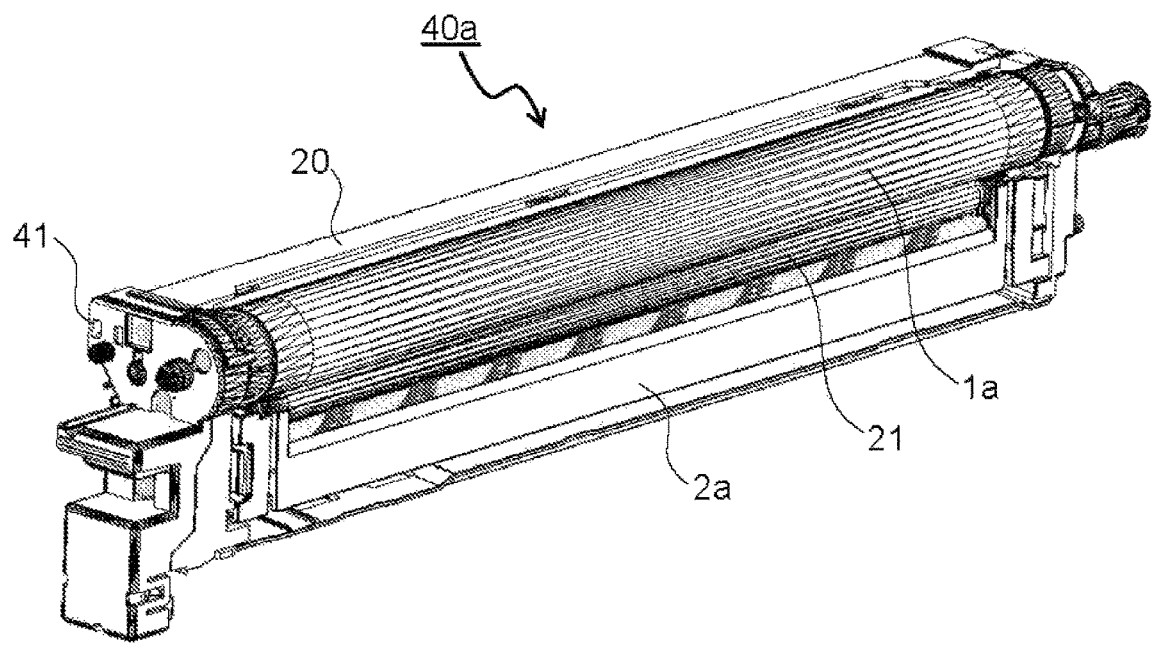
FIG. 3 is a perspective view of a drum unit as seen from a photosensitive drum side.
Figure 4:
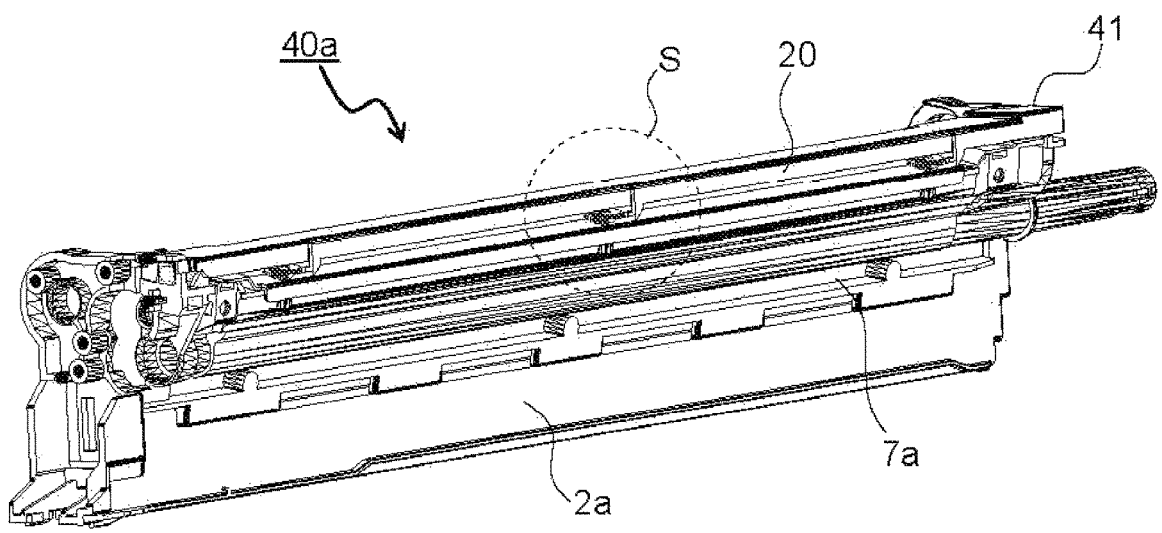
FIG. 4 is a perspective view of the drum unit as seen from a cleaning device side.

FIGS. 3 and 4 are perspective views of the drum unit 40a as seen from the photosensitive drum 1a side and from the cleaning device 7a side respectively. FIG. 4 shows a state where part of a unit frame 41 of the drum unit 40a is removed so that the internal structure of the static eliminating device 20 is visible. The static eliminating device 20 is arranged in the drum unit 40a, to the side of the photosensitive drum 1a, over the cleaning device 7a.

Figure 5:
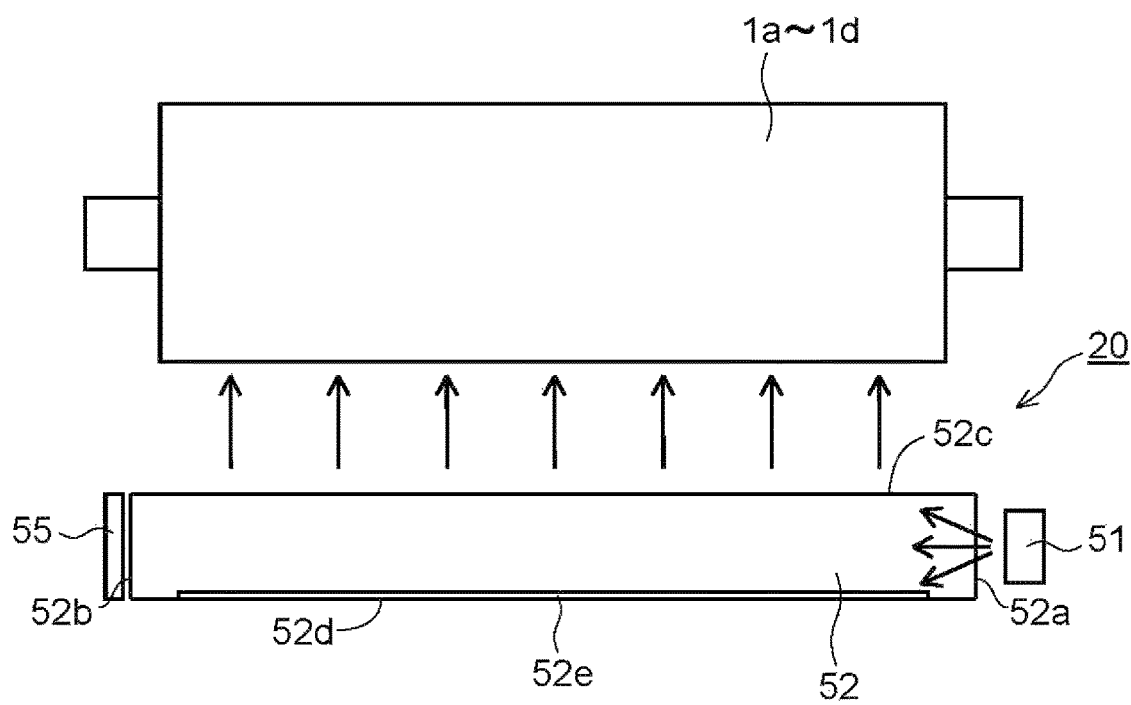
FIG. 5 is a schematic diagram showing the structure of a light source and a light guide in the static eliminating device according to one embodiment of the present disclosure.

FIG. 5 is a schematic diagram showing the structure of a light source 51 and a light guide 52 in the static eliminating device 20 according to one embodiment of the present disclosure. The static eliminating device 20 includes a light source 51 which emits static-eliminating light, a bar-form light guide 52 which extends along the axial direction of the photosensitive drums 1a to 1d, a reflector 55 which is arranged to face an end face (mentioned as the opposite face 52b later) of the light guide 52 on the side opposite from the light source 51, and a light guide cover 60 (see FIG. 6) which holds the light guide 52.

The light source 51 is built with, for example, a light emitting diode (LED) which emits static-eliminating light. The light source 51 is mounted on an unillustrated light source circuit board.

The light guide 52 is formed, using transparent resin such as acrylic resin, in an elongate shape with a substantially semicircular cross section. The light guide 52, while guiding the light from the light source 51 along the direction in which the light guide 52 extends (in the axial direction of the photosensitive drums 1a to 1d), shines the light toward the photosensitive drums 1a to 1d.

The light guide 52 includes a light entrance face 52a which is arranged so as to face the light source 51 to receive the light from the light source 51, an opposite face 52b arranged opposite from the light source 51, a light exit face 52c with an arc-shaped cross section which is arranged between the light entrance face 52a and the opposite face 52b and which faces the photosensitive drums 1a to 1d, and a rear face 52d arranged opposite from the light exit face 52c.

In an area of the rear face 52d excluding edge portions, a reflective portion 52e which reflects the light that has entered the light guide 52 toward the photosensitive drums 1a to 1d (toward the light exit face 52c) is formed along the longitudinal direction of the light guide 52. The reflective portion 52e has a number of prisms (unillustrated) formed in it which are, for example, V-grooves extending in the direction intersecting with the axial direction of the photosensitive drums 1a to 1d (in the direction perpendicular to the plane of FIG. 5).

The light from the light source 51 that has entered the light guide 52 through the light entrance face 52a travels inside the light guide 52 while being diffused, is reflected by the reflective portion 52e toward the light exit face 52c, and exits through the light exit face 52c toward the photosensitive drums 1a to 1d.

The reflector 55 is made of a material with high reflectance such as an aluminum plate, and improves light use efficiency by reflecting the light leaking through the opposite face 52b to shine it back into the light guide 52 through the opposite face 52b.

Figure 6:
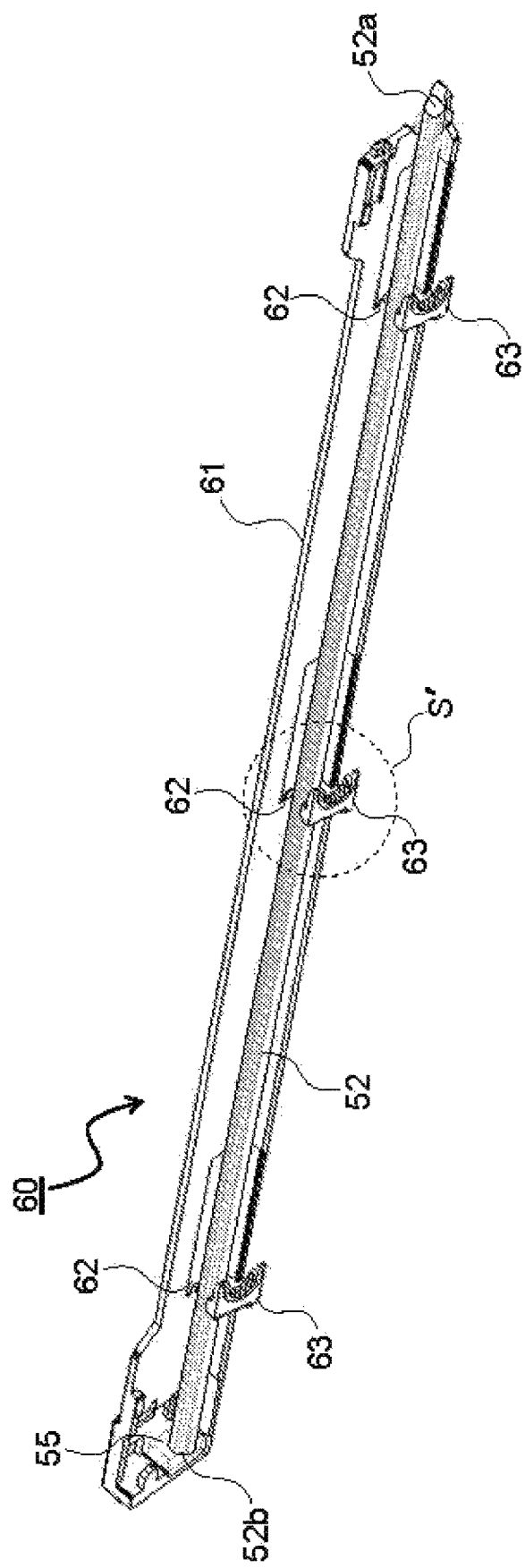
FIG. 6 is a perspective view of the light guide and a light guide cover which constitute the static eliminating device of the embodiment.
Figure 7:
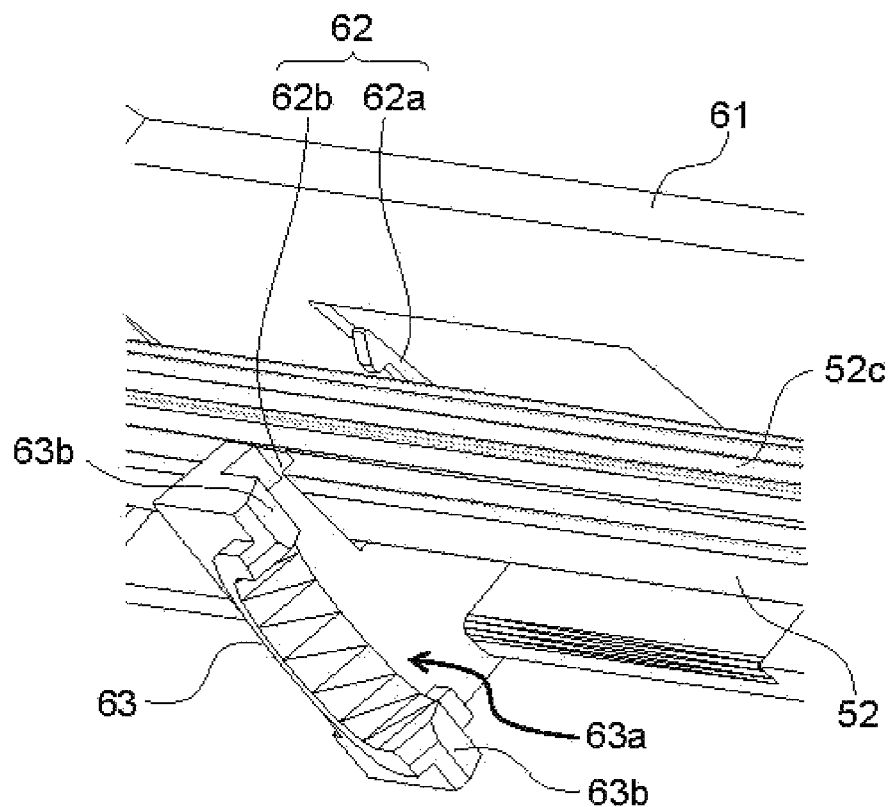
FIG. 7 is an enlarged part view of and around a light guide holding portion in FIG. 6.

FIG. 6 is a perspective view of the light guide 52 and the light guide cover 60 which constitute the static eliminating device 20 of this embodiment. FIG. 7 is an enlarged part view of and around the light guide holding portion 62 in FIG. 6 (the area inside the broken-line circle S' in FIG. 6).

The light guide cover 60 is an elongate plate-form member with substantially the same length as the light guide 52. To an end part of the light guide cover 60 in the longitudinal direction facing the opposite face 52b of the light guide 52 (that is, to a left end part of the light guide cover 60 in FIG. 6), the reflector 55 is fixed. The light guide cover 60 includes an elongate flat plate-form main body portion 61, light guide holding portions 62, and guide engaging portions 63.

The light guide holding portions 62 are provided at a total of three places, in a middle part and near opposite end parts of the main body portion 61 in the longitudinal direction, so as to protrude from the reverse side (lower side in FIG. 6) of the light guide cover 60. As shown in FIG. 7, the light guide holding portion 62 has a first holding claw 62a and a second holding claw 62b for holding the light guide 52 in its radial direction. The interval between the tip end portions of the first and second holding claws 62a and 62b is formed to be slightly smaller than the outer diameter of the light guide 52.

The guide engaging portion 63 is formed integrally with the second holding claw 62b on the corresponding light guide holding portion 62, and is located opposite the main body portion 61 across the light guide holding portion 62. The guide engaging portion 63 is in a U-shape as seen in a plan view having an opening 63a in a part opposite a cover guide 43 (see FIG. 8) in the unit frame 41. At the open end (opposite ends of the U-shape) of the guide engaging portion 63, inclined faces 63b are formed which are inclined downward toward the tip ends.

Now, a procedure for assembling the static eliminating device 20 will be described below. First, the light guide 52 is fitted to the light guide holding portion 62 in the light guide cover 60. To describe in more detail, as shown in FIG. 7, the light guide 52 is clamped between the first and second holding claws 62a and 62b such that the light exit face 52c of the light guide 52 is positioned in the space between the first and second holding claws 62a and 62b. In this way, it is possible to prevent the static-eliminating light emitted from the light exit face 52c from being blocked by the light guide holding portions 62.

Figure 8:
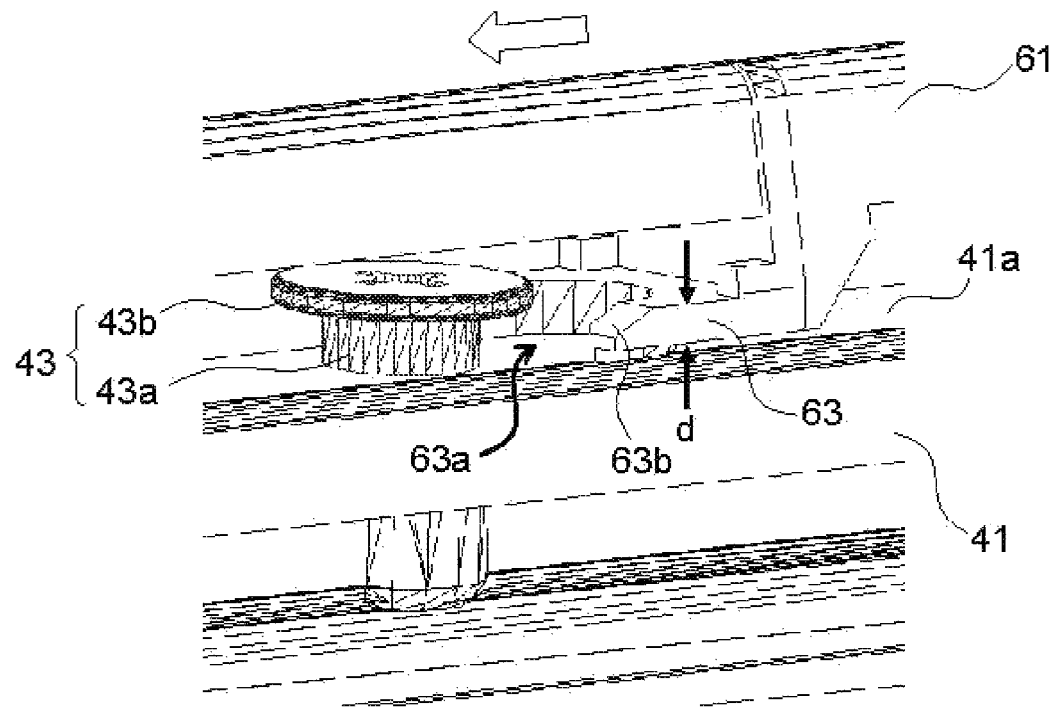
FIG. 8 is an enlarged part view of and around a cover guide and a guide engaging portion immediately before the light guide cover is fitted to a unit frame.
Figure 9:
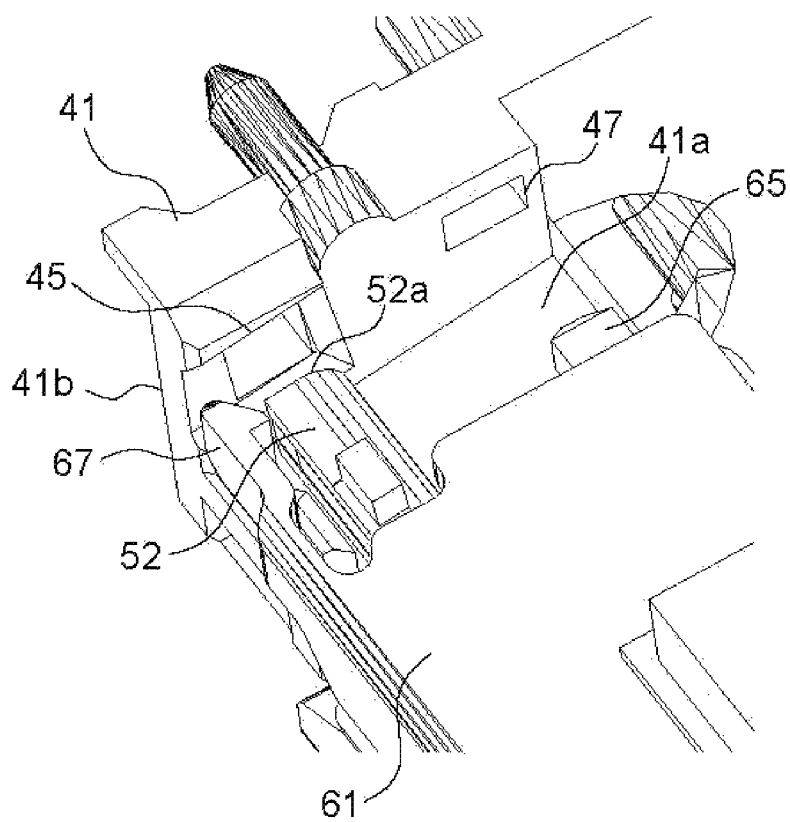
FIG. 9 is an enlarged part view of and around a light entrance face-side end part of the light guide cover immediately before the light guide cover is fitted to the unit frame.

Next, the light guide cover 60 having the light guide 52 fitted to it is attached to the unit frame 41. FIG. 8 is an enlarged part view of and around the cover guide 43 and the guide engaging portion 63 immediately before the light guide cover 60 is fitted to the unit frame 41. FIG. 9 is an enlarged part view of and around a light entrance face 52a-side end part of the light guide cover 60 immediately before the light guide cover 60 is fitted to the unit frame 41.

As shown in FIG. 8, on a cover fitting face 41a of the unit frame 41, a cover guide 43 is provided at the position corresponding to each of the guide engaging portions 63 on the light guide cover 60. The cover guide 43 is formed by screwing a stud screw into a screw hole (unillustrated) formed in the cover fitting face 41a and has a shaft portion 43a and a head portion 43b. The shaft portion 43a is in a cylindrical shape projecting from the cover fitting face 41a. The outer diameter of the shaft portion 43a is substantially equal to the inner diameter of the guide engaging portion 63. The head portion 43b is formed at the tip end of the shaft portion 43a and has a diameter larger than the shaft portion 43a. The length of the shaft portion 43a in the axial direction (the distance between the cover fitting face 41a and the head portion 43b) is substantially equal to the thickness d of the guide engaging portion 63.

As shown in FIG. 9, at a light entrance face 52a-side end part of the light guide cover 60, a positioning boss 65 and a locking hook 67 are formed. In the unit frame 41, an insertion hole 45 and a positioning hole 47 are formed.

Figure 10:
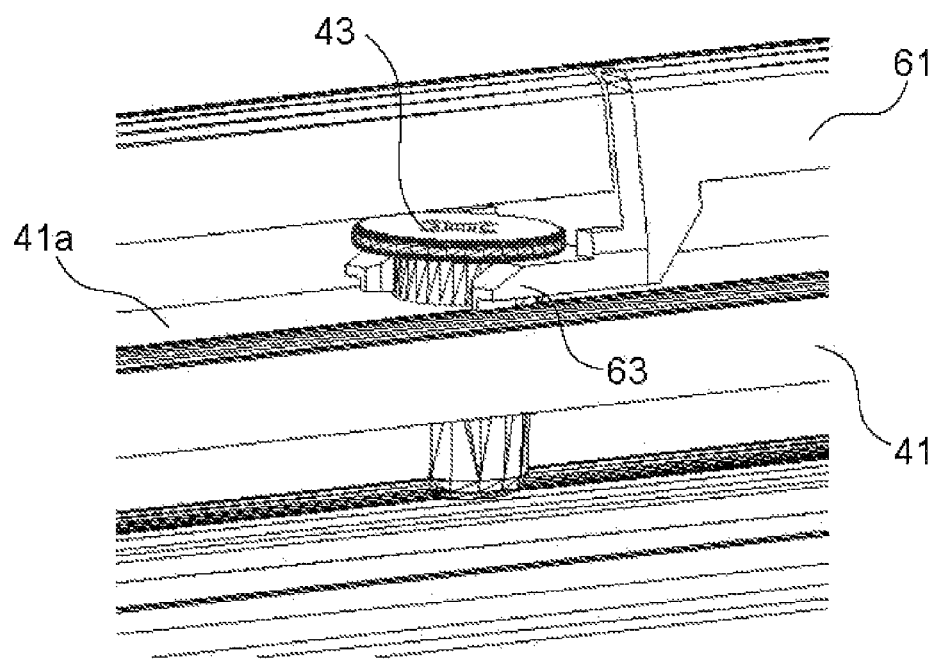
FIG. 10 is an enlarged part view of and around the cover guide and the guide engaging portion after the light guide cover is fitted to the unit frame.

FIG. 10 is an enlarged part view of and around the cover guide 43 and the guide engaging portion 63 (the area inside the broken-line circle S in FIG. 4) after the light guide cover 60 is fitted to the unit frame 41. Sliding the light guide cover 60 from the state in FIG. 8 in the attaching direction (in the direction of the hollow arrow in FIG. 8) along the cover fitting face 41a causes, as shown in FIG. 10, the guide engaging portion 63 to engage with the cover guide 43. With the inclined faces 63b formed at the tip ends of the guide engaging portion 63, the guide engaging portion 63 can be easily inserted in the space between the cover fitting face 41a and the head portion 43b of the cover guide 43.

In the insertion hole 45, a light entrance face 52a-side end part of the light guide 52 is inserted, and the light source 51 (see FIG. 5) arranged inside the insertion hole 45 faces the light entrance face 52a. In the positioning hole 47, the positioning boss 65 on the light guide cover 60 is inserted. The light guide cover 60 is thereby positioned with respect to the unit frame 41 in the direction perpendicular to the longitudinal direction. Then, as a result of the locking hook 67 on the light guide cover 60 engaging with a corner 41b of the unit frame 41, the light guide cover 60 is positioned with respect to the unit frame 41 in the longitudinal direction (in the attaching direction).

According to the structure of this embodiment, when the static eliminating device 20 is assembled, the light guide 52 is preliminary supported by the light guide holding portions 62 provided at three places on the light guide cover 60 in the longitudinal direction. It is thus possible to fit the light guide 52, in a state where it is attached to the light guide cover 60, to the unit frame 41, and this makes it easier to assemble the static eliminating device 20.

Then, the guide engaging portion 63 formed integrally with the light guide holding portion 62 engages with the cover guide 43 on the unit frame 41, and thereby the light guide cover 60 is fitted substantially parallel to the cover fitting face 41a of the unit frame. Accordingly, also the light guide 52 held by the light guide cover 60 is, together with the light guide cover 60, held substantially parallel to the cover fitting face 41a.

In this way, even when the light guide 52 has a warp, the warp is straightened as a result of the cover guide 43 and the guide engaging portion 63 engaging with each other. Thus, it is possible to suppress unevenness in the quantity of emitted light in the axial direction of the light guide 52. Also, by integrally forming the light guide holding portion 62 and the guide engaging portion 63 at the same position on the light guide cover 60 in the longitudinal direction, the warp-straightening force exerted by engagement of the cover guide 43 with the guide engaging portion 63 is transmitted to the light guide 52 directly. Thus, it is possible to enhance the curve-straightening efficiency of the light guide 52.

In addition, the engaging direction of the guide engaging portion 63 with respect to the cover guide 43 is the same as the insertion direction of the light guide 52 and the positioning boss 65 with respect to the insertion hole 45 and the positioning hole 47. Thus, simply by engaging the cover guide 43 with the guide engaging portion 63, it is possible to align the light guide 52 and the positioning boss 65 with respect to the insertion hole 45 and the positioning hole 47. This leads to improved workability during the assembly of the static eliminating device 20.

The embodiment described above is in no way meant to limit the present disclosure, which thus allows for many modifications and variations within the spirit of the present disclosure. For example, although the above embodiments deal with an example where the guide engaging portion 63 is formed integrally with the light guide holding portion 62 on the light guide cover 60, it is also possible to form the guide engaging portion 63 at a position different from the light guide holding portion 62.

It is also possible to modify, for example, the shapes, the sizes, and the numbers of the light guide holding portion 62, the guide engaging portion 63, and the cover guide 43 appropriately in accordance with the dimensions, the shape, and the like of the light guide 52. For example, although the above embodiments deal with an example of the cover guide 43 having a cylindrical shaft portion 43a and a head portion 43b, the shaft portion 43a may be in a polygonal columnar shape. In that case, the guide engaging portion 63, which engages with the cover guide 43, may be in, instead of a semicircular shape, a rectangular shape having an opening 63 in one side. The cover guide 43 is not limited to one formed by screwing in a stud screw; it may instead be formed integrally with the unit frame 41.

In the above embodiments, the position of the static eliminating device 20 is on the upstream side of the cleaning devices 7a to 7d with respect to the rotation direction of the photosensitive drums 1a to 1d, on the downstream side of the primary transfer rollers 6a to 6d. Instead, the static eliminating device 20 may be arranged on the upstream side of the charging devices 2a to 2d with respect to the rotation direction of the photosensitive drums 1a to 1d, on the downstream side of the cleaning devices 7a to 7d.

Although the above embodiments deal with the static eliminating device 20 in which the light guide 52 and the light guide cover 60 are attached to the unit frame 41, the structure of the present disclosure may be applied to, for example, a lighting unit that is used in an image reading portion in a copier or in an image scanner to irradiate a document image with light.

Although the above embodiments deal with an example where the present disclosure is applied to a color printer like the one shown in FIG. 1 as an image forming apparatus 100 incorporating a static eliminating device 20, the present disclosure may be applied to any other image forming apparatuses such as monochrome printers, monochrome copiers, digital multifunction peripherals, and facsimile machines.

The present disclosure is applicable to a lighting device including a light source and a light guide which guides and sends forth the light from the light source. Based on the present disclosure, it is possible to provide a lighting device which prevents a warp in a light guide and which is easy to build, as well as to provide a static eliminating device and an image forming apparatus incorporating such a lighting device.

What is claimed is:

1. A lighting device comprising:
   a light source;
   a light guide which is in a bar form and which, while guiding light that has entered from the light source along an axial direction, sends forth the light;
   a light guide cover which holds the light guide along a longitudinal direction; and
   a unit frame to which the light guide cover is attached, wherein
   the light guide cover includes
      an elongate flat plate-form main body portion,
      a plurality of light guide holding portions which are provided along a longitudinal direction of the main body portion and which hold the light guide at a plurality of places in the longitudinal direction, and
      a plurality of guide engaging portions provided at predetermined intervals along the longitudinal direction of the main body portion, and the unit frame has
- a cover fitting face to which the light guide cover is attached, and
- a plurality of cover guides which are formed on the cover fitting face, at positions corresponding to the guide engaging portions, and with which the plurality of guide engaging portions engage respectively.

2. The lighting device according to claim 1, wherein the guide engaging portion is formed opposite the main body portion across the light guide holding portion and is formed integrally with the light guide holding portion.

3. The lighting device according to claim 1, wherein the guide engaging portion is in a U-shape as seen in a plan view having an opening in a part facing the cover guide, the cover guide includes a columnar shaft portion projecting from the cover fitting face and a head portion formed at a tip end of the shaft portion and having a diameter larger than the diameter of the shaft portion, and a length of the shaft portion in an axial direction is substantially equal to a thickness of the guide engaging portion.

4. The lighting device according to claim 3, wherein the guide engaging portion has, at opposite ends of the opening, inclined faces which are inclined downward in an engaging direction with the cover guide.

5. The lighting device according to claim 3, wherein the light guide includes a light entrance face which is provided at one end thereof in the longitudinal direction to receive light from the light source and a light exit face which extends along the longitudinal direction of the light guide and which, while guiding the light that has entered through the light entrance face along the axial direction, sends forth the light, and in the unit frame, an insertion hole in which a light entrance face-side end part of the light guide is inserted is formed, and the engaging direction of the guide engaging portion with respect to the cover guide is same as an insertion direction of the light guide in the insertion hole.

6. The lighting device according to claim 5, wherein the light guide holding portion includes a first holding claw and a second holding claw between which the light guide is clamped in a radial direction, and the light guide is held such that the light exit face is positioned in a space between the first and second holding claws.

7. The lighting device according to claim 5, wherein at a light entrance face-side end part of the light guide cover, a positioning boss is formed, and in the unit frame, a positioning hole in which the positioning boss is inserted is formed, and as a result of the light entrance face-side end part of the light guide cover being inserted in the insertion hole and the positioning boss being inserted in the positioning hole, the light guide cover is positioned with respect to the unit frame in a direction perpendicular to the longitudinal direction.

8. The lighting device according to claim 5, wherein at a light entrance face-side end part of the light guide cover, a locking hook is formed, and as a result of the locking hook engaging with a corner of the unit frame, the light guide cover is positioned with respect to the unit frame in the longitudinal direction.

9. A static eliminating device which, using the lighting device according to claim 1, shines static-eliminating light to a surface of an image carrier on which an electrostatic latent image is formed.

10. An image forming apparatus comprising:
a static eliminating device according to claim 9; and
an image forming portion including the image carrier of which a surface is electrostatically discharged by the static eliminating device.

* * * * *